United States Patent
Agrawal et al.

(10) Patent No.: US 8,576,872 B2
(45) Date of Patent: Nov. 5, 2013

(54) MULTI-HOP WIRELESS MESH NETWORK MEDIUM ACCESS CONTROL PROTOCOL

(75) Inventors: Avneesh Agrawal, San Diego, CA (US); David Jonathan Julian, San Diego, CA (US); Nikhil Jain, Mendham, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 684 days.

(21) Appl. No.: 11/548,561

(22) Filed: Oct. 11, 2006

(65) Prior Publication Data
US 2007/0147322 A1 Jun. 28, 2007

Related U.S. Application Data
(60) Provisional application No. 60/728,439, filed on Oct. 19, 2005.

(51) Int. Cl.
*H04L 12/413* (2006.01)
(52) U.S. Cl.
USPC .......... 370/447; 370/343; 370/344; 370/445; 370/462
(58) Field of Classification Search
USPC ............................... 370/435, 441, 447, 462
See application file for complete search history.

(56) References Cited

U.S. PATENT DOCUMENTS

| | | | |
|---|---|---|---|
| 5,732,077 A * | 3/1998 | Whitehead | 370/349 |
| 6,246,693 B1 * | 6/2001 | Davidson et al. | 370/445 |
| 6,665,276 B1 * | 12/2003 | Culbertson et al. | 370/282 |
| 6,853,713 B1 * | 2/2005 | Fobert et al. | 379/142.17 |
| 7,075,890 B2 * | 7/2006 | Ozer et al. | 370/230 |
| 7,184,393 B1 * | 2/2007 | Singh et al. | 370/203 |
| 7,339,906 B1 * | 3/2008 | Dahlby et al. | 370/329 |
| 2001/0034851 A1 * | 10/2001 | Randahl et al. | 713/320 |
| 2002/0119781 A1 * | 8/2002 | Li et al. | 455/450 |

(Continued)

FOREIGN PATENT DOCUMENTS

| | | |
|---|---|---|
| JP | 2003348641 A | 12/2003 |
| JP | 2004531971 T | 10/2004 |

(Continued)

OTHER PUBLICATIONS

Arup Acharya, Archan Misra, Sorav Bansal, "MACA-P : A MAC for Concurrent Transmissions in Multi-hop Wireless Networks," Proceedings of the First IEEE International Conference on Pervasive Computing and Communications, Dec. 31, 2003 Abstract; lines 50-65 in col. 6; section A in col. 2 in p. 1371.

(Continued)

*Primary Examiner* — Jason Mattis
*Assistant Examiner* — James P Duffy
(74) *Attorney, Agent, or Firm* — Dang M. Vo

(57) ABSTRACT

Systems and methodologies are described that facilitate mitigating a hidden node condition in a wireless mesh network wherein nodes utilize a request-to-send/clear-to-send (RTS/CTS) protocol in conjunction with an asynchronous hybrid automatic repeat request protocol. For instance, a node may contend for a set of subcarriers by sending an RTS signal over the desired subcarriers, and may receive a CTS signal over the contended subcarriers, wherein the CTS signal indicates which subcarriers the node may transmit data over. If another node has won the contention for a particular subcarrier, requesting node may adjust a power level at which it transmits an RTS or a data packet in order to permit the requesting node to utilize the subcarrier without interfering with the winning node.

41 Claims, 12 Drawing Sheets

(56) References Cited

U.S. PATENT DOCUMENTS

| | | | |
|---|---|---|---|
| 2002/0172186 A1* | 11/2002 | Larsson | 370/349 |
| 2002/0191573 A1 | 12/2002 | Whitehill et al. | |
| 2003/0076829 A1* | 4/2003 | Rabie et al. | 370/391 |
| 2004/0057462 A1* | 3/2004 | Lim et al. | 370/468 |
| 2005/0002355 A1 | 1/2005 | Takano | |
| 2005/0002364 A1* | 1/2005 | Ozer et al. | 370/338 |
| 2005/0058151 A1* | 3/2005 | Yeh | 370/445 |
| 2005/0143119 A1 | 6/2005 | Chandra et al. | |
| 2005/0169232 A1 | 8/2005 | Sakoda et al. | |
| 2008/0273606 A1* | 11/2008 | Orfanos et al. | 375/260 |

FOREIGN PATENT DOCUMENTS

| | | |
|---|---|---|
| JP | 2004328570 A | 11/2004 |
| JP | 2006527523 T | 11/2006 |
| JP | 2007511972 T | 5/2007 |
| RU | 2002118207 A | 2/2004 |
| RU | 2004131658 A | 7/2005 |
| WO | WO2004109473 A2 | 12/2004 |
| WO | WO2005022775 A1 | 3/2005 |
| WO | WO2005050918 A2 | 6/2005 |

OTHER PUBLICATIONS

Daji Qiao, et al.: "Adaptive Transmit Power control in IEEE 802.11a Wireless LANs" VTC 2003-Spring. the 57th. IEEE Semiannual Vehicular Technology Conference. Proceedings. Jeju, Korea, Apr. 22-25, 2003, IEEE Vehicular Technology Conference, New York, NY: IEEE, US, vol. 4 of 4, Conf. 57, pp. 433-437 XP010862163.
International Search Report—PCT/US06/060090, International Search Authority, European Patent Office—Apr. 3, 2007.
Kyu-Tae Jin and Dong-Ho Cho, "Multi-Code MAC for Multi-Hop Wireless Ad Hoc Networks," Proceedings 2002 IEEE 56th Vehicular Technology Conference, 2002. Dec. 31, 2002 Lines 7-28 in col. 1 in p. 1100.
Mustafa Ozdemir, A. Bruce McDonald, "A Queuing Theoretic Model for IEEE 802.11 DCF using RTS/CTS," Local and Metropolitan Area Networks, 2004. LANMAN 2004. The 13th IEEE Workshop on, pp. 33-38. Apr. 28, 2004 Lines 3-7 in col. 2; lines 1-9 in section 1 in col. 1.
Taiwanese Search Report—095138505—TIPO—Feb. 23, 2010 (date at the very bottom of document).
Written Opinion—PCT/US06/060090, International Searching Authority—European Patent Office, Apr. 3, 2007.

* cited by examiner

MULTI-HOP WIRELESS MESH NETWORK MEDIUM ACCESS CONTROL PROTOCOL

CLAIM OF PRIORITY UNDER 35 U.S.C. §119

This application claims the benefit of U.S. Provisional Application Ser. No. 60/728,439, entitled "A MULTI-HOP WIRELESS MESH NETWORK MEDIUM ACCESS CONTROL PROTOCOL," filed on Oct. 19, 2005; the entirety of which is incorporated herein by reference.

BACKGROUND

I. Field

The following description relates generally to wireless communications, and more particularly to reducing interference in a wireless communication environment.

II. Background

Wireless communication systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

More particularly, frequency division based techniques typically separate the spectrum into distinct channels by splitting it into chunks of bandwidth, which may be uniform or non-uniform. For example, division of the frequency band allocated for wireless communication can be split into 30 channels, each of which can carry a voice conversation or, with digital service, carry digital data. Each channel can be assigned to one user at a time. One known variant is an orthogonal frequency division technique that effectively partitions the overall system bandwidth into multiple orthogonal subbands. These subbands are also referred to as tones, carriers, subcarriers, bins, and/or frequency channels. Each subband is associated with a subcarrier that can be modulated with data. With time division based techniques, a band is split time-wise into sequential time slices or time slots. Each user of a channel is provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and code division techniques) includes zero or more (e.g., in an ad hoc network) base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations. Additionally, in unplanned, or ad hoc deployments, where mobile terminals act as relays for other mobile terminals to permit communication with a server or base station, bandwidth may be limited and/or congested in areas where signal strength is minimal. Resource allocation can become difficult, necessitating resource sharing in a manner that is spectrally efficient. Accordingly, a need in the art exists for systems and/or methodologies that facilitate reducing interference and improving throughput in an ad hoc wireless communication environment.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with various aspects, systems and methods described herein facilitate mitigating a "hidden node" condition that can occur when nodes transmit at different transmit power levels while employing a request-to-send (RTS)/clear-to-send (CTS) resource allocation mechanism. The hidden node condition occurs when a node (e.g., an access terminal, an access point, a transmitting node, etc.) begins transmitting because it has sensed that a resource (e.g., a channel, a subcarrier, etc.) is idle, when in fact the resource is being utilized for transmission by another node, thus creating excess interference at a receiving node. According to some aspects, a node may contend for a subcarrier independently by transmitting an RTS on the subcarrier for which the node is contending. Asynchronous hybrid automatic repeat request protocols may be utilized to increase reliability and permit aggressive rate prediction.

According to an aspect, a method of multi-carrier wireless transmission may comprise contending for a set of subcarriers independent of contending for other subcarriers and determining whether a subset of the set of contended subcarriers is available for data transmission. The method may further comprise transmitting a request to send (RTS) signal for the set of contended subcarriers, transmitting a preference list of subcarriers, receiving a clear-to-send (CTS) signal for a subset of the set of contended subcarriers, wherein the CTS signal has been transmitted at a known power spectral density (PSD), transmitting a data signal utilizing the subset of contended subcarriers, and/or transmitting the data signal utilizing less than total available bandwidth associated with the subset of contended subcarriers.

According to a another aspect, an apparatus that facilitates multi-carrier wireless transmission may comprise a contending module configured to contend for one or more subcarriers independently of other subcarriers; and a determining module configured to determine whether a subset of the contended subcarriers are available. The apparatus may further comprise a transmitter that sends a request-to-send (RTS) signal for the one or more contended subcarriers, and a receiver that receives a clear-to-send (CTS) signal for a subset of the one or more contended subcarriers. Additionally, the transmitter may transmit a data signal utilizing the subset of the one or more contended subcarriers.

According to yet another aspect, an apparatus that facilitates performing multi-carrier wireless transmission may comprise means for contending for a set of subcarriers independently of other subcarriers, and means for determining whether a subset of the contended set of subcarriers is available for data transmission. The apparatus may additionally comprise means for transmitting a request to send (RTS) signal for the contended set of subcarriers within a portion of available bandwidth, which is less than the total bandwidth utilized for multiple access. The apparatus may further comprise means for receiving a clear-to-send (CTS) signal for the contended set of subcarriers, upon which the means for transmitting may send a data packet over the contended set of subcarriers.

Still another aspect relates to a machine-readable medium comprising instructions for facilitating multi-carrier wireless transmission, wherein the instructions upon execution cause a machine to contend for a set of subcarriers independent of contending for other subcarriers, and to determine whether a subset of the set of contended subcarriers is available for data transmission.

Yet another aspect relates to a processor for facilitating multi-carrier wireless transmission, the processor being configured to contend for one or more subcarriers independent of contending for other subcarriers, and to determine whether a subset of the one or more contended subcarriers is available for data transmission.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

DETAILED DESCRIPTION

Figure 1:
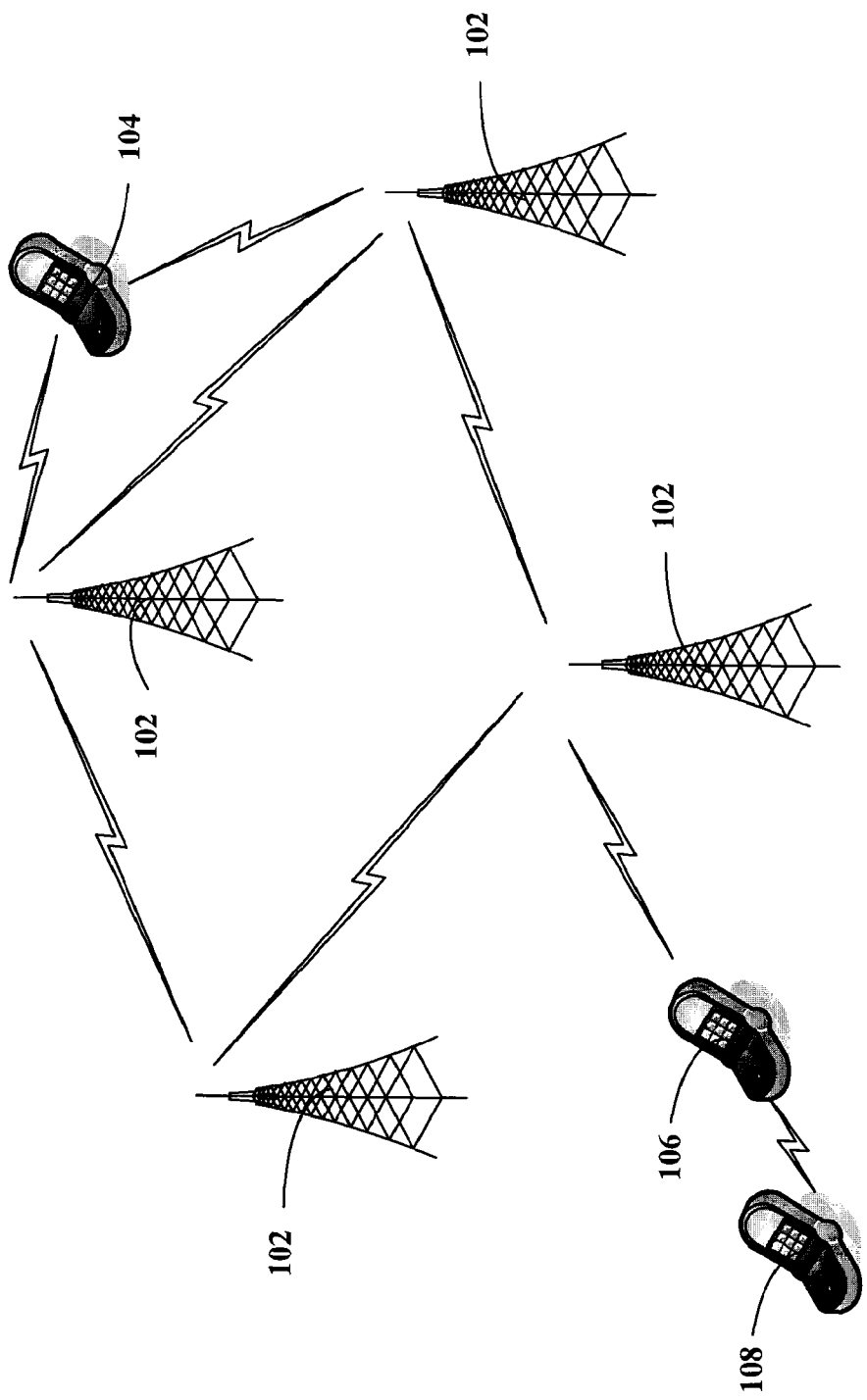
FIG. 1 is an illustration of an ad hoc, or mesh, wireless communication environment, in accordance with various aspects.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a subscriber station. A subscriber station can also be called a system, a subscriber unit, mobile station, mobile, remote station, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. It will be appreciated that the word "exemplary" is used herein to mean "serving as an example, instance, or illustration." Any aspect or design described herein as "exemplary" is not necessarily to be construed as preferred or advantageous over other aspects or designs.

FIG. 1 is an illustration of an ad hoc, or mesh, wireless communication environment 100, in accordance with various aspects. System 100 can comprise one or more access points 102 in one or more sectors that receive, transmit, repeat, etc., wireless communication signals to each other and/or to one or more access terminals 104, 106, 108. Each access point 102 can comprise a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Access terminals 104, 106, 108 may be, for example, cellular phones, smart phones, laptops, handheld communication devices, handheld computing devices, satellite radios, global positioning systems, PDAs, and/or any other suitable device for communicating over wireless network 100. System 100 can be employed in conjunction with various aspects described herein in order facilitate providing scalable resource reuse in a wireless communication environment, as set forth with regard to subsequent figures.

Terminals 104, 106, 108 are typically dispersed throughout the system, and each terminal may be fixed or mobile. A terminal may also be called a mobile station, user equipment, a user device, or some other terminology. A terminal may be a wireless device, a cellular phone, a personal digital assistant (PDA), a wireless modem card, and so on. Each terminal 104 may communicate with zero, one, or multiple access points on the downlink and uplink at any given moment. The downlink (or forward link) refers to the communication link from the access points to the terminals, and the uplink (or reverse link) refers to the communication link from the terminals to the access points. Although the innovation may be employed using separate forward and reverse links, it may also utilize a single set of links for communication between access terminals and/or access points.

For a distributed architecture, access points 102 may communicate with one another as needed. Data transmission on the forward link occurs from one access point to one access terminal at or near the maximum data rate that can be supported by the forward link and/or the communication system. Additional channels of the forward link (e.g., control channel) may be transmitted from multiple access points to one access terminal. Reverse link data communication may occur from one access terminal to one or more access points.

According to other aspects, the ad hoc network may be a multi-hop ad hoc network, wherein an access terminal 108 utilizes another access terminal 106 as a relay to an access point 102. For instance, access terminal 108 may determine that it does not have sufficient signal strength to transmit to access points 102, but that access terminal 106 does have sufficient signal strength. In such a case, access terminal 108 may route reverse link communication through access terminal 106 to one or more access points 102. Thus, access terminal 106 may act as an access point for access terminal 108.

Referring to FIGS. 2-8, methodologies relating to providing medium access control in a multi-hop mesh network are illustrated. For example, methodologies can relate to providing medium access control in a multi-hop mesh network in an FDMA environment, an OFDMA environment, a CDMA environment, a WCDMA environment, a TDMA environment, an SDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 2:
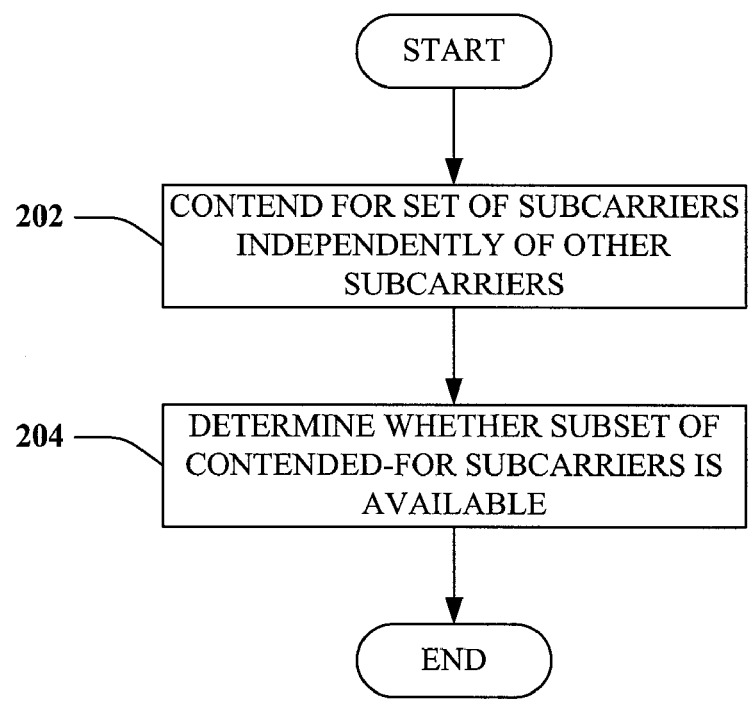
FIG. 2 is an illustration of a methodology for contending for subcarriers in a multi-carrier wireless communication environment, in accordance with various aspects.

FIG. 2 is an illustration of a methodology 200 for contending for subcarriers in a multi-carrier wireless communication environment, in accordance with various aspects. Under some resource assignment schemes, a central authority, such as a sector controller or the like, may provide resource assignments to user devices. Method 200, on the other hand, relates to resource contention between nodes, such as access terminals, so that the access terminals may not request resource assignments. Rather, terminals may contend among themselves for available resources (e.g., frequencies, channels, subcarriers, tones, etc. At 202, a node may contend for a subcarrier independently of other subcarriers. For instance, when available bandwidth may be divided into separate and distinct subcarriers, a request-to-send (RTS)/clear-to-send (CTS) protocol may be executed for each subcarrier independently. An access terminal may transmit an RTS signal over a set of subcarriers, and may determine whether a subset of the contended subcarriers is available for use during a subsequent transmission, at 204. The determination of subcarrier availability may be based on, for instance, CTS signals received over all or a subset of the contended subcarriers. Thus, the access terminal may not submit a request for a predetermined number of subcarriers and wait to receive a subcarrier assignment, but rather may submit an RTS over each specific subcarrier over which the terminal would like to transmit.

Figure 3:
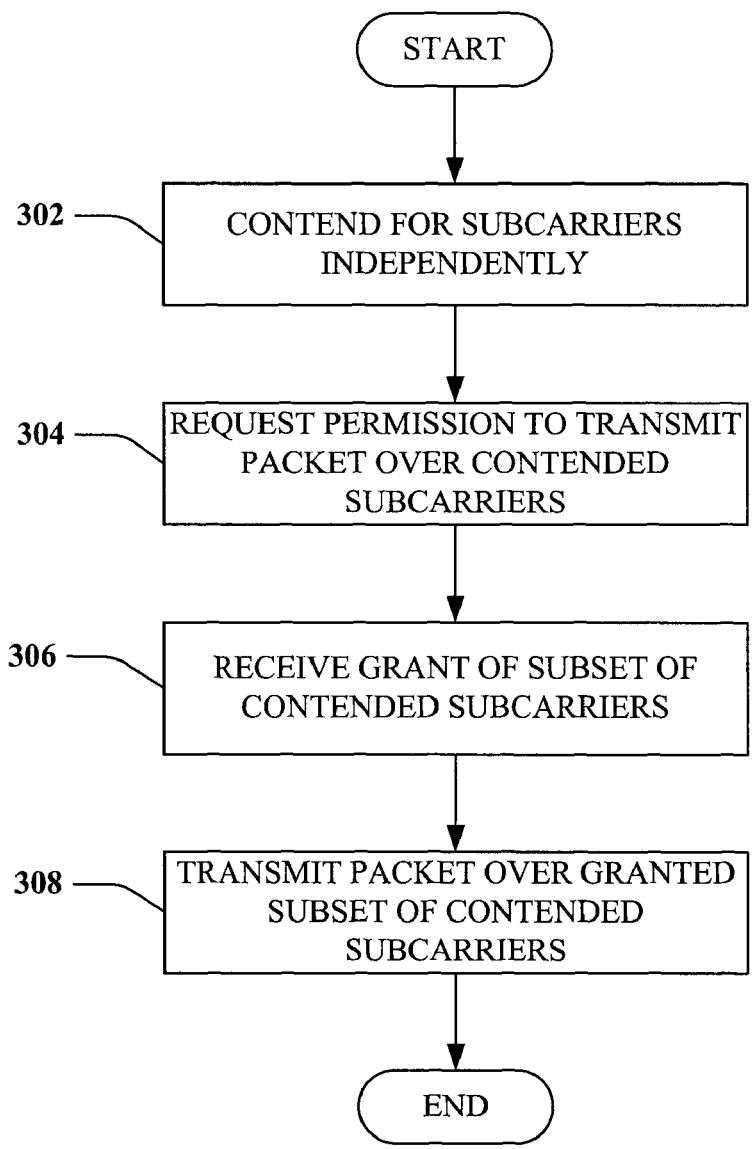
FIG. 3 is an illustration of a methodology that facilitates performing a multi-hop wireless mesh network medium access control (MAC) protocol, in accordance with one or more aspects described herein.

FIG. 3 is an illustration of a methodology 300 that facilitates performing a multi-hop wireless mesh network medium access control (MAC) protocol, in accordance with one or more aspects described herein. At 302, a particular subcarrier may be contended for independently of contention for any other subcarrier. At 304, a request may be transmitted that indicates a desire to transmit a data packet over the contended subcarrier (e.g., an RTS) within a portion of available bandwidth that is used for multiple access. The portion of available bandwidth may be some portion less than all available bandwidth used for multiple access in a wireless communication environment in which method 300 is employed. Upon receipt of a grant (e.g., a CTS signal or some other form of approval) of the contended subcarrier at 306, the method may proceed to 308, where the data packet may be transmitted over the contended subcarrier(s).

With regard to a multi-hop wireless mesh network medium access control, approaches may include carrier sense multiple access/collision avoidance (CSMA/CA), and request-to-send/clear-to-send (RTS/CTS). CSMA/CA is a protocol for carrier transmission in 802.11 networks. For instance, when a user device has data to send, the user device senses the channel to see if it is idle. If the channel is idle, then the user device transmits the data, otherwise the user backs off for a random period of time before it senses the channel again. In a mesh network environment where all users may not be able to communicate with each other, CSMA/CA leads to a "hidden node" problem where a user may sense the channel idle and start sending data, creating undesirably high interference at a nearby receiving node (e.g., when the user could not hear the transmitting node).

The RTS/CTS protocol mitigates the hidden node problem. For instance, when a user device has data to send, the user device may send an RTS signal to the receiver, and the receiver sends a CTS signal to the transmitter and all surrounding nodes, at which point the transmitter sends the data. When a particular node receives an RTS or a CTS, then the node does not use the channel for a specified period of time, and refrains from sending RTS, CTS or data. RTS/CTS eliminates the hidden node problem when all user devices have the same transmit power, but may create an "exposed node" issue where some user devices do not transmit even though they would not collide with any other user devices. Moreover, the hidden node problem returns to RTS/CTS when nodes have different transmit powers.

A multiple access scheme divides the available bandwidth up into subcarriers. Available bandwidth is the bandwidth that may be utilized by a user device for data transmission. RTS/CTS is employed on each subcarrier, and user devices contend independently on each subcarrier. An asynchronous hybrid automatic repeat request protocol is utilized for added reliability and to improve and allow for more aggressive rate prediction. Additionally, equal transmit power spectral density (PSD) power control may be utilized to allow for different transmit powers. For instance, user devices with greater transmit power can achieve higher peak rates by utilizing more bandwidth, while user devices with lesser transmit power utilize less bandwidth but still achieve the equal PSD.

Dividing the spectrum into multiple subcarriers has several advantages. First, it allows for statistical multiplexing of load. Second, user devices contend for an amount of bandwidth needed based on their buffer size, and rate prediction allows for more efficient use of the bandwidth. The multi-carriers also provide for interference and spatial usage variations.

RTS/CTS may be implemented on each subcarrier using one or more of a variety of approaches. One approach involves contending independently on each subcarrier and to send the RTS and CTS over the entire subcarrier. A second approach is to contend jointly across subcarriers and then encode the data packet across the successfully achieved subcarriers. When contending jointly across subcarriers, a transmitter may send a 1-bit RTS on all of the desired subcarriers and utilize the subset of subcarriers on which it receives a CTS signal. Alternatively the transmitter may indicate a preference list of subcarriers.

Asynchronous hybrid automatic repeat request (Async HARQ) is utilized for more aggressive rate prediction. In asynchronous HARQ, the transmitter sends a packet and looks for an acknowledgement that the packet was successfully sent. If the ACK is not received, then the user device schedules and sends a second packet, which consists of incrementally redundant information to assist with decoding the first packet. The incrementally redundant information may provide better performance than a simple repetition code, which would be achieved by just retransmitting the data. In asynchronous HARQ every retransmission sub-packet is scheduled. So each sub-packet contends using RTS/CTS.

Figure 4:
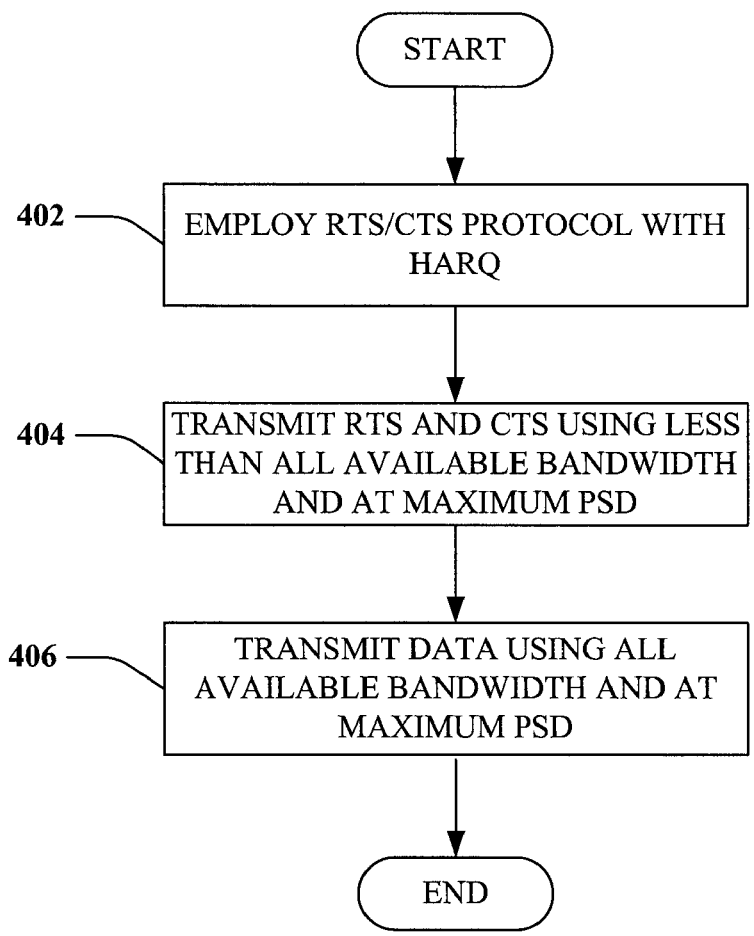
FIG. 4 is an illustration of a methodology for restricting RTS and CTS bandwidth to facilitate independent subcarrier contention, in accordance with one or more aspects.

FIG. 4 is an illustration of a methodology 400 for restricting RTS and CTS bandwidth to facilitate independent subcarrier contention, in accordance with one or more aspects. For instance, equal transmit power spectral density (PSD) power control may be utilized in conjunction with the various aspects described herein. For RTS/CTS to mitigate the hidden node problem, each a transmitting node may be made able to hear a CTS from nodes with which its transmissions interfere. This may be achieved by selecting a maximum transmit power spectral density for the network. The RTS, CTS, and data may be transmitted at this PSD over a desired subcarrier. More specifically, the signal may be transmitted at a known PPSD, which may be the maximum PSD, over a subset of the subcarrier bandwidth to allow for all nodes of a predetermined transmit power range to achieve the maximum PSD. For instance, if the subcarriers span 1 MHz of bandwidth, the RTS and CTS may be transmitted over 1 kHz of bandwidth, allowing for a 30 dB dynamic range in supported transmit powers. Data may be sent at or below the known PSD. Thus, the hidden node condition may be mitigated, even for devices of disparate transmit power capabilities.

According to the method, at 402, an RTS/CTS technique may be initiated in conjunction with an asynchronous HARQ protocol. RTS and CTS bandwidth may be restricted to utilize less than the full data subcarrier bandwidth, and transmitted at a known PSD, which may be a maximum PSD that a node will utilize for data transmission, over the restricted bandwidth, while the data may be transmitted over the entire subcarrier at the known PSD, at 404. At 406, a data transmission may be sent over granted subcarriers using all available bandwidth and at the known PSD. According to other aspects, subcarrier bandwidth for the RTS and CTS may be restricted, and the RTS and CTS may be transmitted at the known PSD over the restricted bandwidth, while the data is transmitted over the subcarrier at less than the maximum, or known, PSD based on rate prediction. This aspect also allows for a node with a maximum transmit power constraint to utilize the entire bandwidth even if the node does not have sufficient power to transmit at the known PSD over the entire bandwidth. In this manner, data transmission is robust to ensure successful delivery, while RTS/CTS signals are transmitted over an optimized portion of available bandwidth to mitigate unnecessary bandwidth consumption and to reduce interference.

Figure 5:
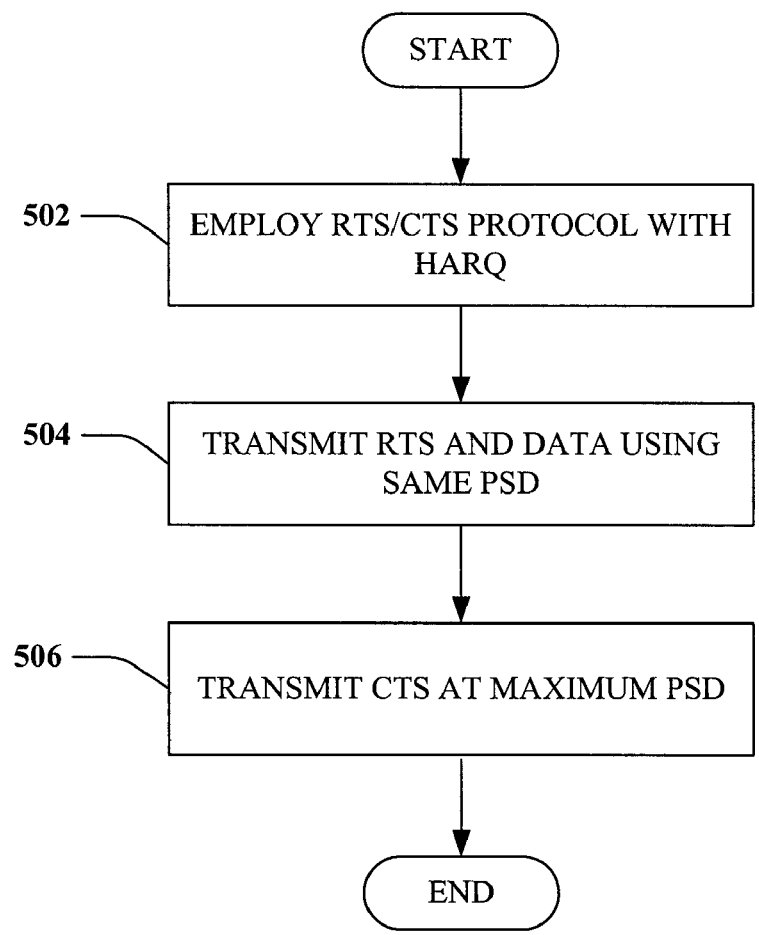
FIG. 5 is an illustration of a methodology for independently contending for subcarriers in a wireless mesh network to facilitate medium access control, in accordance with various aspects.

FIG. 5 is an illustration of a methodology 500 for independently contending for subcarriers in a wireless mesh network to facilitate medium access control, in accordance with various aspects. At 502, an RTS/CTS protocol with asynchronous HARQ may be initiated to permit subcarrier contention between nodes in a wireless service area. At 504, an RTS message may be sent over a restricted portion of available bandwidth at a PSD that is the same as a known PSD used for sending data transmissions, and which may be less than the known PSD, which may facilitate reducing unnecessary interference. Additionally, the lower PSD may facilitate reducing an exposed node condition, in the case of RTS, because sending the RTS at the lower PSD has the effect of notifying only those devices that may actually experience interference during data transmission. At 506, a CTS signal, which has been transmitted at the known PSD, may be received to ensure that the contending nodes hear the CTS. For example, an access terminal may choose to use more bandwidth than the access terminal can support at the maximum PSD for a number of reasons, such as when the access terminal has sufficient data to fill the bandwidth, when the user device senses the channel idle for period of time, or other heuristics.

Several variations can be applied to RTS/CTS for better spatial reuse, where more nodes are transmitting at the same time in a spectrally efficient way. When the baseline version of RTS/CTS is used, an exposed node condition may occur wherein some users are prohibited from transmitting, even though their transmission would not cause significant interference to the RTS/CTS reserved transmission. Moreover, RTS/CTS protocols may attempt to achieve a thermal-limited environment where the interference power at the receiver is much less than the thermal noise power.

Figure 6:
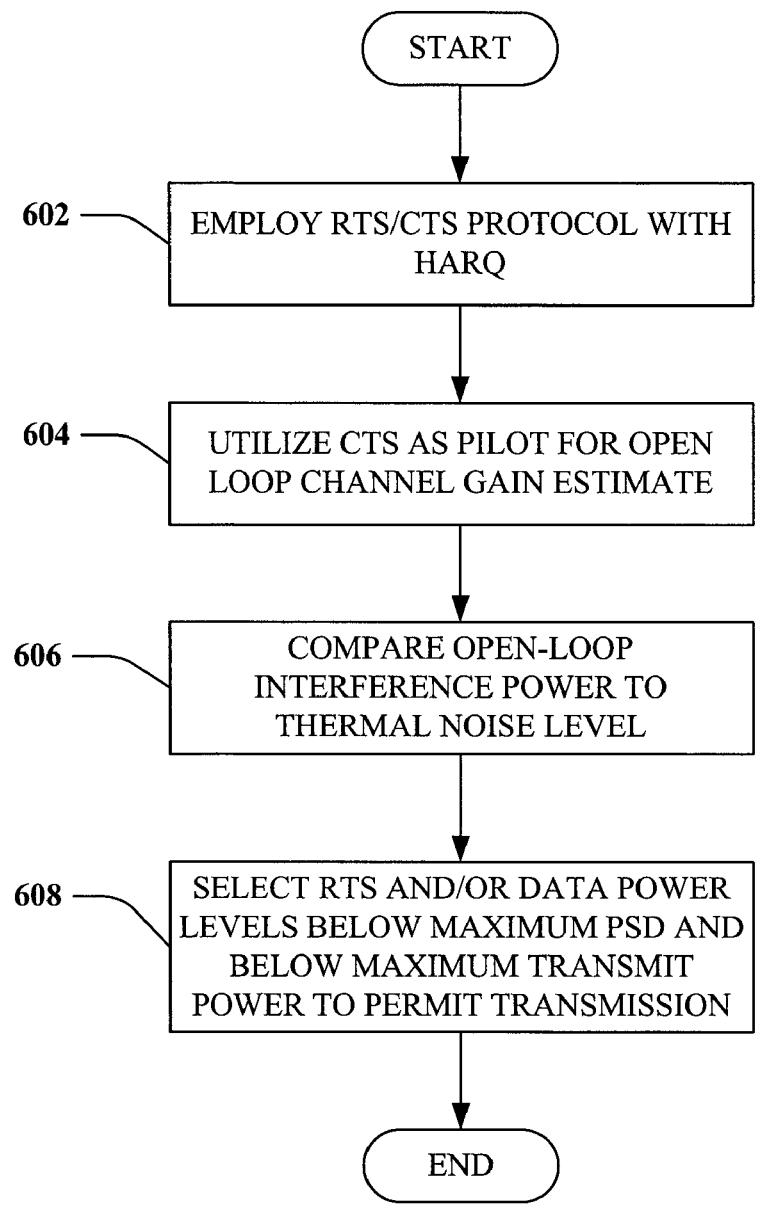
FIG. 6 illustrates a methodology for improving spatial reuse by utilizing a CTS as a pilot for an open loop channel gain estimate, in accordance with various aspects.

FIG. 6 illustrates a methodology 600 for improving spatial reuse by utilizing a CTS signal as a pilot for an open loop channel gain estimate, in accordance with various aspects. For instance, at 602, an RTS/CTS protocol using asynchronous HARQ techniques may be initiated to permit subcarrier contention between nodes. Once a node has received a CTS indicating that another node, such as an access point or another access terminal, has won the contention for a particular subcarrier or subcarriers, the node may use the CTS signal as an open-loop pilot signal to perform channel gain estimation, etc., at 604. At 606, open loop interference levels may be compared to a thermal noise level. In order to ensure that transmission is permitted over a subcarrier that has been granted to another node by the CTS, PSD and transmission power levels for RTS and data transmissions may be selected at less-than maximum levels, at 608. Thus, RTS and data may be sent at a power level that results in a less-than-maximum PSD, and the transmitter may be able to proceed with the transmission because it will not interfere with the node that won the contended subcarrier, even through the CTS indicating such was received.

Figure 7:
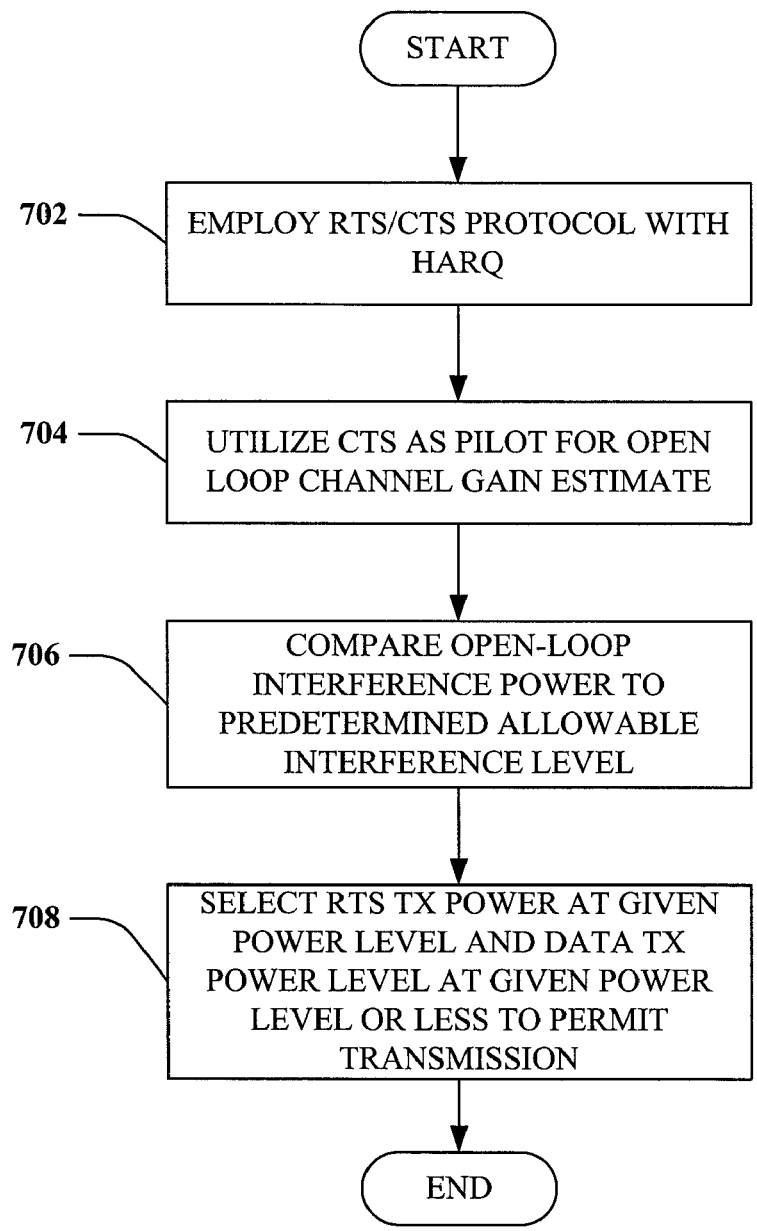
FIG. 7 is an illustration of a methodology for selecting appropriate PSD and transmission power levels to mitigate interference when transmitting over subcarriers for which another node has won contention, in accordance with some aspects.

FIG. 7 is an illustration of a methodology 700 for selecting appropriate PSD and transmission power levels to mitigate interference when transmitting over subcarriers for which another node has won contention, in accordance with some aspects. At 702, an RTS/CTS protocol may be initiated to permit subcarrier contention between nodes in a wireless service area. At 704, a CTS signal that has been received may be used as a pilot signal for channel gain estimation and the like. In this manner, method 700 permits the transmitter to operate at an interference-limited level instead of a thermal-limited level. Thus, open-loop-computed interference power may be compared to a predetermined permissible interference level, at 706, rather than to a thermal noise level, as described above with regard to FIG. 6. The predetermined permissible interference level may be specified as an interference level over thermal (IOT), such that IOT=(I+N)/N, where I is the interference power and N is the thermal noise power. The transmitter may select the RTS transmission power at a given PSD, and the data transmission power at the given PSD or lower, in order to ensure that the RTS and data transmissions are permitted over a subcarrier that has been granted to another contending node, at 708. In this manner, a node that has lost contention for a desired subcarrier may still transit over the subcarrier without interfering with the node that has won the contention there for.

Figure 8:
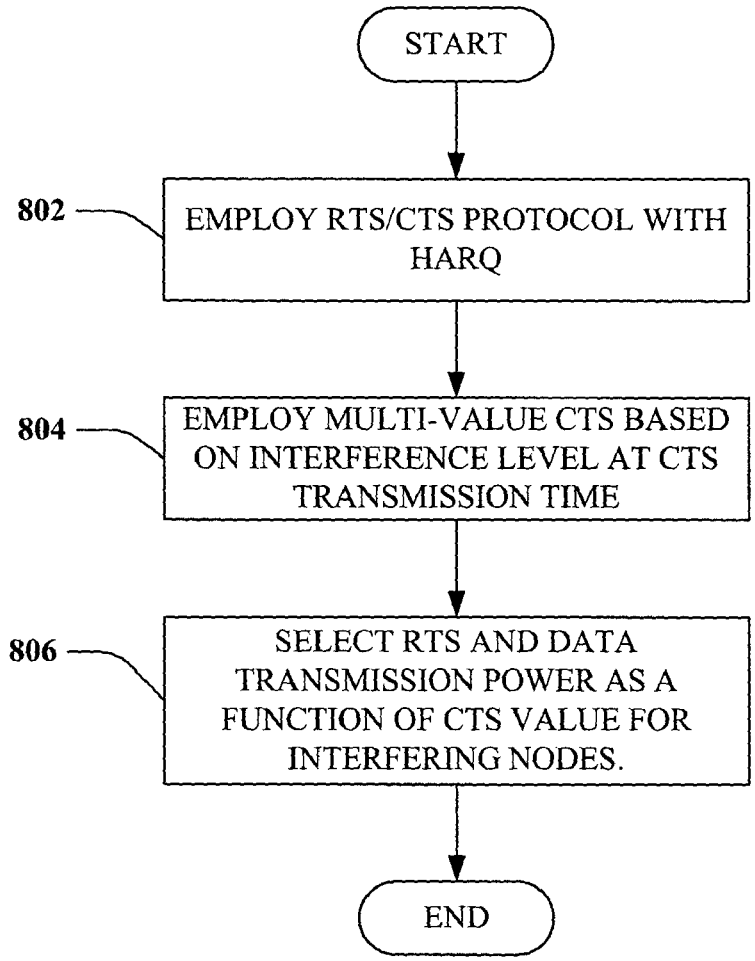
FIG. 8 illustrates a methodology for utilizing a multi-valued CTS to facilitate permitting a node to transmit over a subcarrier that has been granted to another node without interfering with the other node, in accordance with one or more aspects.

FIG. 8 illustrates a methodology 800 for utilizing a multi-valued CTS to facilitate permitting a node to transmit over a subcarrier that has been granted to another node without interfering with the other node, in accordance with one or more aspects. At 802, an RTS/CTS with HARQ protocol may be employed to permit subcarrier contention between multiple nodes in a wireless mesh network. At 804, a multi-value CTS may be employed, which may have a value that is a function of interference levels at the time of CTS transmission. At 806, a node that hears the CTS, but that loses contention for the subcarrier(s) for which the CTS is provided, may select a transmission power level and a PSD level for RTS and data transmission as a function of the CTS value.

For example, a two-value CTS (or n-value, where n is an integer) may be utilized in conjunction with the foregoing. A node may normally send a CTS value of 0 in response to an RTS. However, if a threshold number of HARQ retransmissions has been exceeded recently, the node may send a CTS value of 1 in response to an RTS. If another node receives a CTS value of 0, then it may be permitted to transmit its RTS and data at an open loop PSD, creating interference up to the system target IOT level. If the node receives a CTS value of 1, then it may be permitted to transmit the RTS and data at an open loop PSD much less than the IOT level. Additional CTS values may be utilized to target interference equal to X % of the IOT for different values of X, where X=0 represents the standard CTS which blocks transmission.

Figure 9:
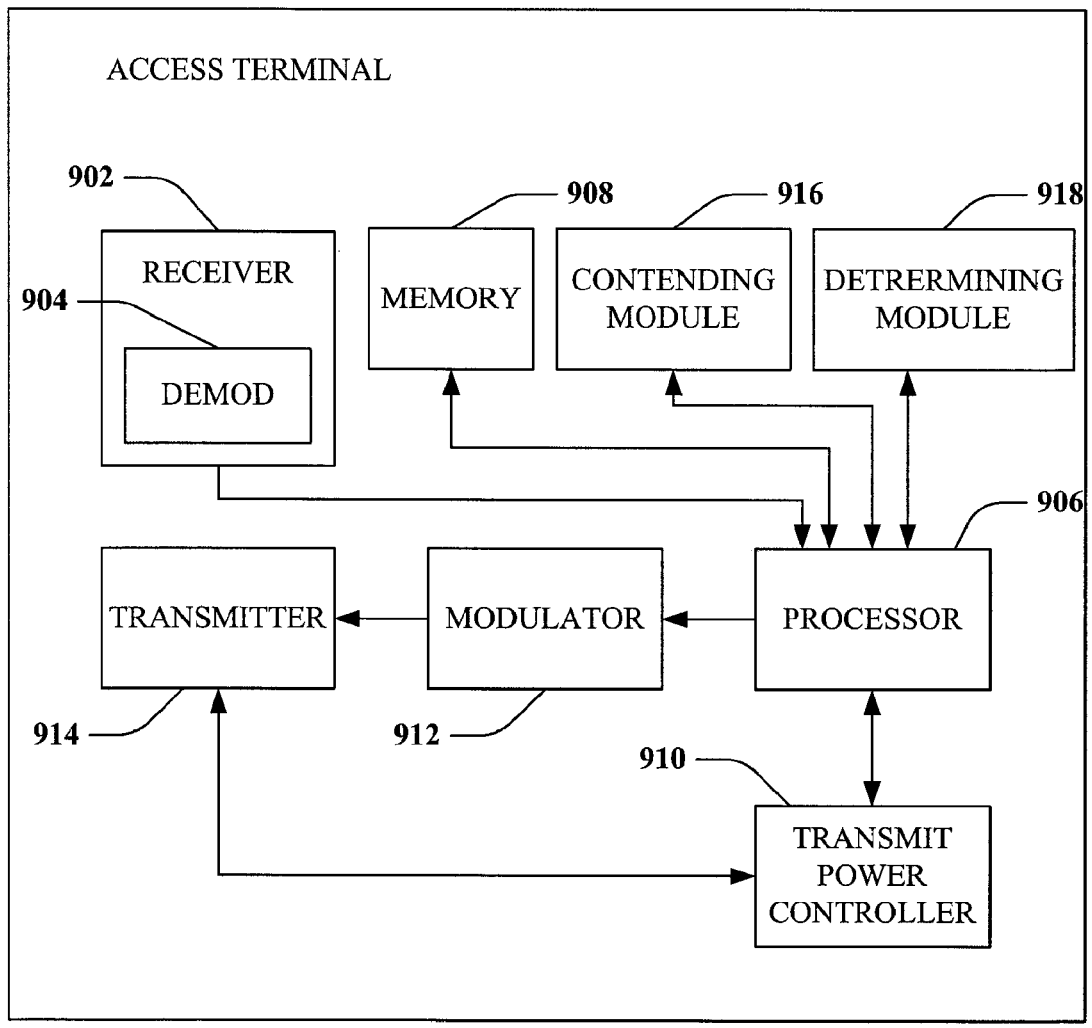
FIG. 9 is an illustration of an access terminal that facilitates medium access control in a multi-hop wireless mesh network, in accordance with one or more aspects.

FIG. 9 is an illustration of an access terminal 900 that facilitates medium access control in a multi-hop wireless mesh network, in accordance with one or more aspects. Access terminal 900 comprises a receiver 902 that receives a signal via, for instance, a receive antenna (not shown), and performs typical actions thereon (e.g., filters, amplifies, downconverts, etc.) the received signal and digitizes the conditioned signal to obtain samples. Receiver 902 may comprise a demodulator 904 that demodulates received symbols and provides them to a processor 906 for channel estimation and other actions. Processor 906 may be a processor dedicated to analyzing information received by receiver 902 and/or generating information for transmission by a transmitter 914, a processor that controls one or more components of access terminal 900, and/or a processor that both analyzes information received by receiver 902, generates information for transmission by transmitter 914, and controls one or more components of access terminal 900. Additionally, processor 906 may be operatively associated with a contending module 916, which may execute instructions for contending for subcarriers, individually or in sets, independently of contending for other subcarriers or sets of subcarriers. Processor 906 may further be coupled to a determining module 918 that determines whether one or more contended subcarriers is available for transmissions. For instance, determining module may execute instructions for performing RTS/CTS protocols, for comparing interference and/or thermal noise levels to one or more predetermined threshold levels and determining whether to adjust transmission power levels to permit transmission over a contended subcarrier, etc.

Access terminal 900 can additionally comprise memory 908 that is operatively coupled to processor 906 and that may store data to be transmitted, received data, and the like. Memory 908 may store information related to threshold interference or noise levels, protocols for performing RTS/CTS, HARQ protocols, transmission power level adjustment protocols, etc.

It will be appreciated that the data store (e.g., memory 908) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and methods is intended to comprise, without being limited to, these and any other suitable types of memory.

Processor 906 is further operatively coupled to transmit power controller 910, which may adjust a transmit power level for one or more of a RTS message, a CTS message, a data message in order to permit transmission over a subcarrier for which another node has won contention, as described above. Access terminal 900 still further comprises a modulator 912 and a transmitter 914 that transmits the signal to, for instance, a base station, an access point, another access terminal, a remote agent, etc. Although depicted as being separate from the processor 906, it is to be appreciated that transmit power controller 910, contending module 916, and/or determining module 918 may be part of processor 906 or a number of processors (not shown).

Figure 10:
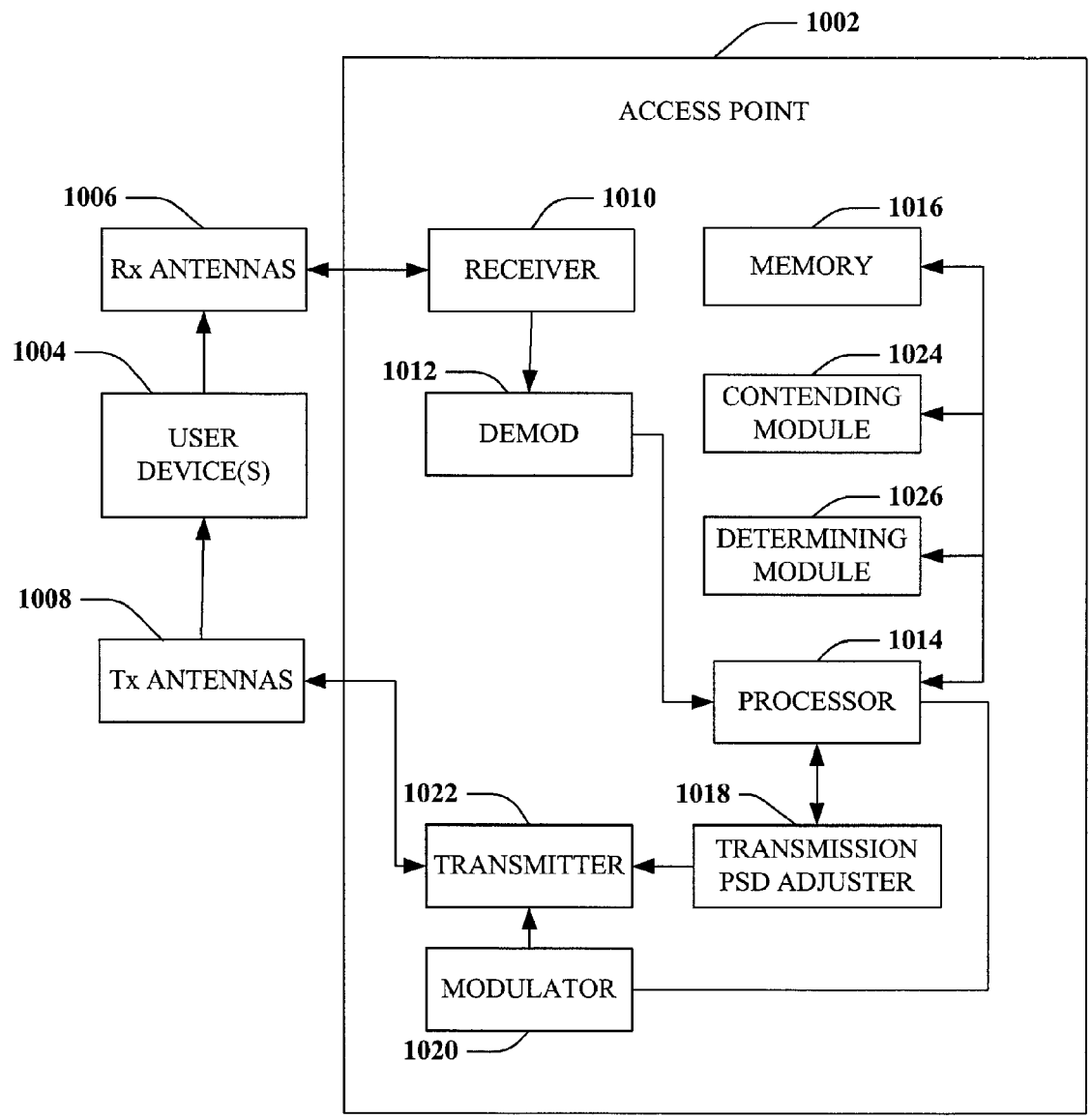
FIG. 10 is an illustration of a system that facilitates adjusting transmit power to permit transmission over a subcarrier that has been won by another contending node, without interfering with the winning node, in accordance with one or more aspects.

FIG. 10 is an illustration of a system 1000 that facilitates adjusting transmit power to permit transmission over a subcarrier that has been won by another contending node, without interfering with the winning node, in accordance with one or more aspects. System 1000 comprises an access point 1002 with a receiver 1010 that receives signal(s) from one or more user devices 1004 through a plurality of receive antennas 1006, and a transmitter 1022 that transmits to the one or more user devices 1004 through a transmit antenna 1008. Receiver 1010 can receive information from receive antennas 1006 and is operatively associated with a demodulator 1012 that demodulates received information. Demodulated symbols are analyzed by a processor 1014 that can be similar to the processor described above with regard to FIG. 9, and which is coupled to a memory 1016 that stores information related to subcarrier contention, transmit power adjustment, and/or any other suitable information related to performing the various actions and functions set forth herein.

Processor 1014 may be further coupled to transmission PSD adjuster 1018, which may adjust transmission power to achieve a desired PSD. For example, transmission PSD adjuster 1018 may adjust a transmission power level to achieve a target PSD for an RTS signal, a CTS signal, a data transmission, etc., as described above with regard to various other aspects.

Processor 1014 may further be coupled to a contending module 1024 that may execute instructions for contending for subcarriers, individually or in sets, independently of contending for other subcarriers or sets of subcarriers. A determining module may determine whether contended subcarriers are available by executing instructions for performing RTS/CTS protocols, for comparing interference and/or thermal noise levels to one or more predetermined threshold levels and determining whether to adjust transmission power levels to permit transmission over a contended subcarrier, etc. Processor 1014 may be further coupled to a modulator 1020, which may multiplex assignment information for transmission by a transmitter 1022 through antenna 1008 to user device(s) 1004. Although depicted as being separate from processor 1014, it is to be appreciated that transmission PSD adjuster 1018, modulator 1020, contending module 1024, and/or determining module 1026 may be part of processor 1014 or a number of processors (not shown).

Figure 11:
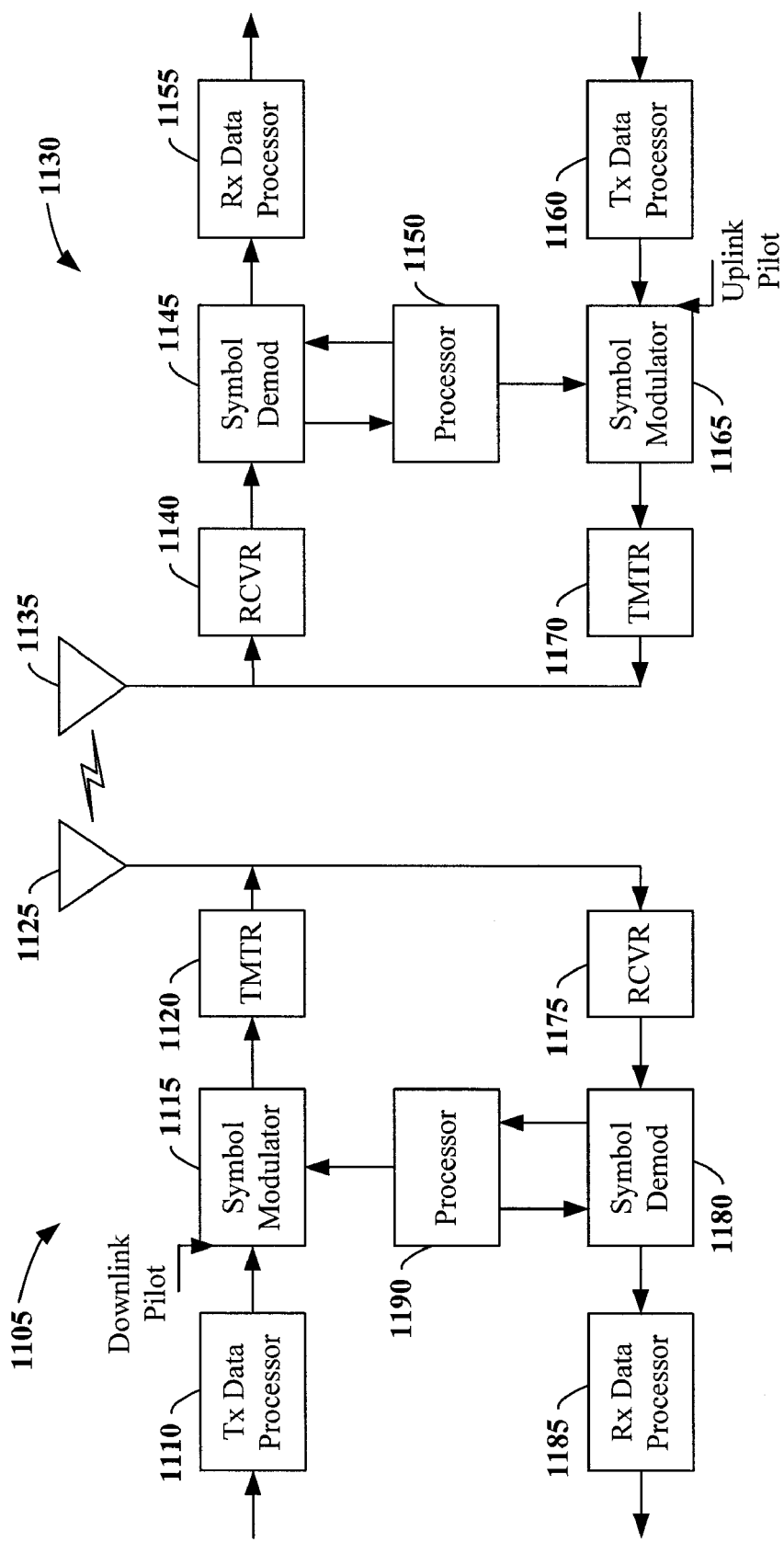
FIG. 11 is an illustration of a wireless network environment that can be employed in conjunction with the various systems and methods described herein.

FIG. 11 shows an exemplary wireless communication system 1100. The wireless communication system 1100 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the methods (FIG. 2-8) and/or systems (FIGS. 1, 9, 10, and 12) described herein to facilitate wireless communication there between.

Referring now to FIG. 11, on a downlink, at access point 1105, a transmit (TX) data processor 1110 receives, formats, codes, interleaves, and modulates (or symbol maps) traffic data and provides modulation symbols ("data symbols"). A symbol modulator 1115 receives and processes the data symbols and pilot symbols and provides a stream of symbols. A symbol modulator 1120 multiplexes data and pilot symbols and provides them to a transmitter unit (TMTR) 1120. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1120 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1125 to the terminals. At terminal 1130, an antenna 1135 receives the downlink signal and provides a received signal to a receiver unit (RCVR) 1140. Receiver unit 1140 conditions (e.g., filters, amplifies, and frequency downconverts) the received signal and digitizes the conditioned signal to obtain samples. A symbol demodulator 1145 demodulates and provides received pilot symbols to a processor 1150 for channel estimation. Symbol demodulator 1145 further receives a frequency response estimate for the downlink from processor 1150, performs data demodulation on the received data symbols to obtain data symbol estimates (which are estimates of the transmitted data symbols), and provides the data symbol estimates to an RX data processor 1155, which demodulates (i.e., symbol demaps), deinterleaves, and decodes the data symbol estimates to recover the transmitted traffic data. The processing by symbol demodulator 1145 and RX data processor 1155 is complementary to the processing by symbol modulator 1115 and TX data processor 1110, respectively, at access point 1105.

On the uplink, a TX data processor 1160 processes traffic data and provides data symbols. A symbol modulator 1165 receives and multiplexes the data symbols with pilot symbols, performs modulation, and provides a stream of symbols. A transmitter unit 1170 then receives and processes the stream of symbols to generate an uplink signal, which is transmitted by the antenna 1135 to the access point 1105.

At access point 1105, the uplink signal from terminal 1130 is received by the antenna 1125 and processed by a receiver unit 1175 to obtain samples. A symbol demodulator 1180 then processes the samples and provides received pilot symbols and data symbol estimates for the uplink. An RX data processor 1185 processes the data symbol estimates to recover the traffic data transmitted by terminal 1130. A processor 1190 performs channel estimation for each active terminal transmitting on the uplink. Multiple terminals may transmit pilot concurrently on the uplink on their respective assigned sets of pilot subbands, where the pilot subband sets may be interlaced.

Processors 1190 and 1150 direct (e.g., control, coordinate, manage, etc.) operation at access point 1105 and terminal 1130, respectively. Respective processors 1190 and 1150 can be associated with memory units (not shown) that store program codes and data. Processors 1190 and 1150 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1190 and 1150.

Figure 12:
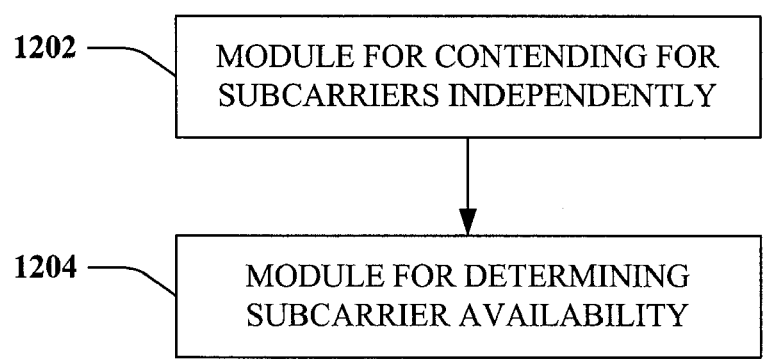
FIG. 12 is an illustration of an apparatus that facilitates performing a multi-hop wireless mesh network medium access control (MAC) protocol, in accordance with one or more aspects described herein.

FIG. 12 is an illustration of an apparatus 1200 that facilitates performing a multi-hop wireless mesh network medium access control (MAC) protocol, in accordance with one or more aspects described herein. Apparatus 1200 is represented as a series of interrelated functional blocks, which can represent functions implemented by a processor, software, or combination thereof (e.g., firmware). For example, apparatus 1200 may provide modules for performing various acts, such as are described above. Apparatus 1200 comprises a module for contending 1202 that contends for (e.g., selects, . . . ) a particular subcarrier or set of subcarriers independently of contention for any other subcarrier. Module for requesting permission 1204 is operatively coupled to a module for determining subcarrier availability 1204, which generates and transmits a request that indicates a desire to transmit a data packet over the contended subcarrier(s) (e.g., a "request-to-send") within a portion of available bandwidth that is used for multiple access. The portion of available bandwidth may be some portion less than all available bandwidth used for multiple access in a wireless communication environment in which apparatus 1200 is employed. Module for determining subcarrier availability 1204 may receive a grant (e.g., a "clear-to-send" signal or some other form of approval) of the contended subcarrier(s), upon which apparatus 1200 may employ a module for transmitting (not shown), which transmits the data packet over the contended subcarrier(s).

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of multi-carrier wireless transmission, the method being implementable in an apparatus and comprising: contending for each one of a plurality of subcarriers independently by transmitting a separate request-to-send (RTS) signal on each one of the plurality of subcarriers; wherein the RTS signal transmitted on one of the one or more of the plurality of subcarriers is transmitted over a narrower frequency bandwidth than the data transmitted on the one of the one or more of the plurality subcarriers; receiving one or more clear-to-send (CTS) signals on one or more of the plurality of subcarriers in response to the RTS signals, wherein the one or more CTS signals indicate to another apparatus receiving the one or more CTS signals that the apparatus has won contention for the one or more of the plurality of subcarriers, and transmitting data via the one or more of the plurality of subcarriers.

2. The method of claim 1, further comprising transmitting a preference list of subcarriers.

3. The method of claim 1, wherein at least one of the one or more received CTS signals has been transmitted at a known power spectral density (PSD).

4. The method of claim 3, further comprising transmitting at least one of the RTS signals at a predefined PSD, and receiving the at least one CTS signal over one or more of the plurality of subcarriers.

5. The method of claim 4, further comprising transmitting the data at a lower PSD than the predefined PSD.

6. The method of claim 3, further comprising transmitting the at least one of the RTS signals and the data at a lower PSD than the predefined PSD.

7. The method of claim 3, further comprising utilizing the at least one CTS signal as a pilot for an open loop channel gain estimate.

8. The method of claim 3, further comprising employing a multi valued CTS signal, wherein a CTS value is based on an interference level associated with a recent RTS signal.

9. The method of claim 8, further comprising selecting a transmission power level for the RTS signal and the data as a function of a CTS value for one or more interfering nodes.

10. The method of claim 1, further comprising transmitting the data utilizing less than total available bandwidth associated with the plurality of subcarriers.

11. The method of claim 1, further comprising employing an asynchronous HARQ protocol to perform rate prediction.

12. The method of claim 1, wherein one or more of the plurality of subcarriers comprise an entire set of contended subcarriers.

13. The method of claim 1, wherein the contending for the plurality of subcarriers comprises contending for an amount of bandwidth needed based on a buffer size and a rate prediction for the apparatus.

14. The method of claim 1, wherein the contending for the plurality of subcarriers comprises receiving a clear-to-send (CTS) signal on one of the plurality of subcarriers independently of receiving a clear-to-send (CTS) signal on another one of the plurality of subcarriers.

15. The method of claim 1, wherein the RTS signal transmitted on the one of the one or more of the plurality of subcarriers is transmitted at a higher power spectral density (PSD) than the data transmitted on the one of the one or more of the plurality of subcarriers.

16. An apparatus that facilitates multi-carrier wireless transmission, comprising: a contending module configured to contend for a plurality of subcarriers independently by transmitting a separate request-to-send (RTS) signal on each one of the plurality of subcarriers; wherein the RTS signal transmitted on one of the one or more of the plurality of subcarriers is transmitted over a narrower frequency bandwidth than the data transmitted on the one of the one or more of the plurality subcarriers; a receiver configured to receive one or more clear-to-send (CTS) signals on one or more of the plurality of subcarriers in response to the RTS signals, wherein the one or more CTS signals indicate to another apparatus receiving the one or more CTS signals that the apparatus has won contention for the one or more of the plurality of subcarriers; and a transmitter configured to transmit data via the one or more of the plurality of subcarriers.

17. The apparatus of claim 16, wherein the transmitter transmits the data over less than all available bandwidth associated with the plurality of subcarriers.

18. The apparatus of claim 16, further comprising a processor that performs rate prediction using an asynchronous HARQ protocol.

19. The apparatus of claim 18, wherein the processor employs at least one of the one or more CTS signals as a pilot for an open loop channel gain estimate.

20. The apparatus of claim 16, wherein the one or more of the plurality of subcarriers comprise all of the plurality of subcarriers.

21. The apparatus of claim 16, wherein the transmitter sends at least one of the RTS signals at a predetermined PSD.

22. The apparatus of claim 21, wherein the transmitter transmits the data at a PSD that is lower than the predetermined PSD.

23. The apparatus of claim 16, wherein the receiver receives at least one of the one or more CTS signals over one or more of the plurality of subcarriers, the at least one CTS having been transmitted at a predetermined PSD.

24. The apparatus of claim 23, wherein the transmitter sends at least one of the RTS signals and the data at a PSD below the predetermined PSD.

25. The apparatus of claim 16, wherein a CTS value indicates an interference level associated with a recent RTS signal.

26. The apparatus of claim 16, wherein the transmitter transmits a preference list of subcarriers.

27. An apparatus that facilitates performing multi-carrier wireless transmission, comprising: means for contending for each one of a plurality of subcarriers independently by transmitting a separate request-to-send (RTS) signal on each one of the plurality of subcarriers; wherein the RTS signal transmitted on one of the one or more of the plurality of subcarriers is transmitted over a narrower frequency bandwidth than the data transmitted on the one of the one or more of the plurality subcarriers; means for receiving one or more clear-to-send (CTS) signals on one or more of the plurality of subcarriers in response to the RTS signals, wherein the one or more CTS signals indicate to another apparatus receiving the one or more CTS signals that the apparatus has won contention for the one or more of the plurality of subcarriers; and means for transmitting data via the one or more of the plurality of subcarriers.

28. The apparatus of claim 27, further comprising means for transmitting at least one of the RTS signals within a portion of available bandwidth, which is less than the total bandwidth utilized for multiple access.

29. The apparatus of claim 28, wherein the means for transmitting sends a data packet over the plurality of subcarriers.

30. The apparatus of claim 29, wherein the means for receiving receives at least one of the one or more CTS signals, which was transmitted at the known PSD, over the one or more of the contended subcarriers.

31. The apparatus of claim 30, wherein the means for transmitting sends the at least one RTS and the data at less than the known PSD.

32. The apparatus of claim 29, further comprising means for utilizing at least one of the one or more CTS signals as a pilot for an open loop channel gain estimate.

33. The apparatus of claim 29, wherein a CTS value indicates an interference level associated with a recent RTS signal.

34. The apparatus of claim 28, wherein the means for transmitting sends the data packet over less than all available bandwidth associated with the plurality of subcarriers.

35. The apparatus of claim 28, wherein the means for transmitting sends the at least one RTS signal at a known PSD.

36. The apparatus of claim 35, wherein the means for transmitting transmits the data at a PSD that is lower than the known PSD.

37. The apparatus of claim 28, wherein the means for transmitting transmits a preference list of subcarriers.

38. The apparatus of claim 27, further comprising means for performing rate prediction using an asynchronous HARQ protocol.

39. A machine-readable storage device encoded with instructions for facilitating multi-carrier wireless transmission, wherein the instructions upon execution cause a machine to: contend for each one of a plurality of subcarriers independently by transmitting a separate request-to-send (RTS) signal on each one of the plurality of subcarriers; wherein the RTS signal transmitted on one of the one or more of the plurality of subcarriers is transmitted over a narrower frequency bandwidth than the data transmitted on the one of the one or more of the plurality subcarriers; receive one or more clear-to-send (CTS) signals on one or more of the plurality of subcarriers in response to the RTS signals, wherein the one or more CTS signals indicate to another apparatus receiving the one or more CTS signals that the apparatus has won contention for the one or more of the plurality of subcarriers, and each of the one or more CTS signals comprises a multi-valued CTS signal; and transmit data via the one or more of the plurality of subcarriers.

40. An access point, comprising: an antenna; a contending module configured to contend for a plurality of subcarriers independently by transmitting a separate request-to-send (RTS) signal on each one of the plurality of subcarriers; wherein the RTS signal transmitted on one of the one or more of the plurality of subcarriers is transmitted over a narrower frequency bandwidth than the data transmitted on the one of the one or more of the plurality subcarriers; a receiver configured to receive one or more clear-to-send (CTS) signals on one or more of the plurality of subcarriers via the antenna in response to the RTS signals, wherein the one or more CTS signals indicate to an apparatus receiving the one or more CTS signals that the access point has won contention for the one or more of the plurality of subcarriers, and each of the one or more CTS signals comprises a multi-valued CTS signal; and a transmitter configured to transmit data via the one or more of the plurality of subcarriers.

41. An access terminal, comprising: a contending module configured to contend for a plurality of subcarriers independently by transmitting a separate request-to-send (RTS) signal on each one of the plurality of subcarriers; wherein the RTS signal transmitted on one of the one or more of the plurality of subcarriers is transmitted over a narrower frequency bandwidth than the data transmitted on the one of the one or more of the plurality subcarriers; a receiver configured to receive one or more clear-to-send (CTS) signals on one or more of the plurality of subcarriers in response to the RTS signals, wherein the one or more CTS signals indicate to an apparatus receiving the one or more CTS signals that the access terminal has won contention for the one or more of the plurality of subcarriers, and each of the one or more CTS signals comprises a multi-valued CTS signal; and a transmitter configured to transmit data via the one or more of the plurality of subcarriers.

\* \* \* \* \*